March 3, 1931. H. C. SCHUELER 1,794,646
HARVESTER
Filed Feb. 29, 1928
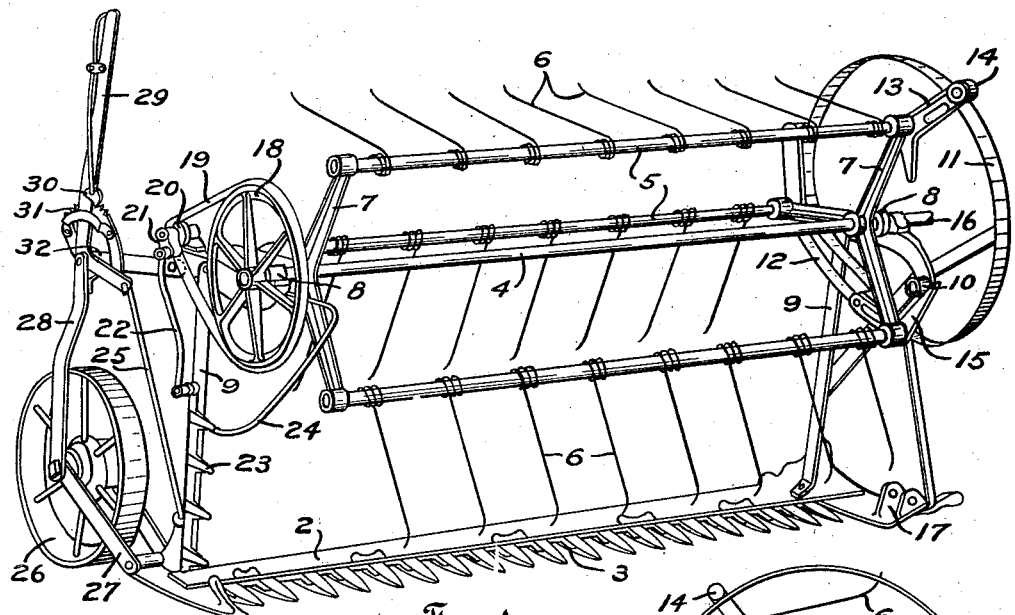
Fig. 1
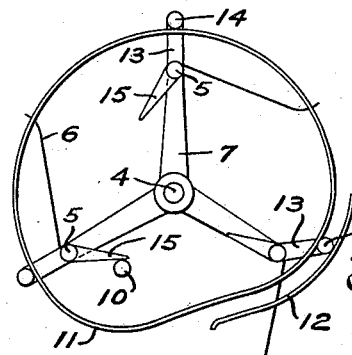
Fig. 2
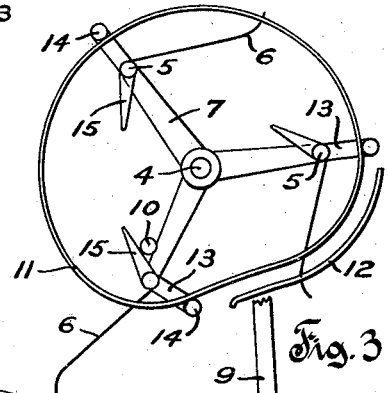
Fig. 3
Fig. 4
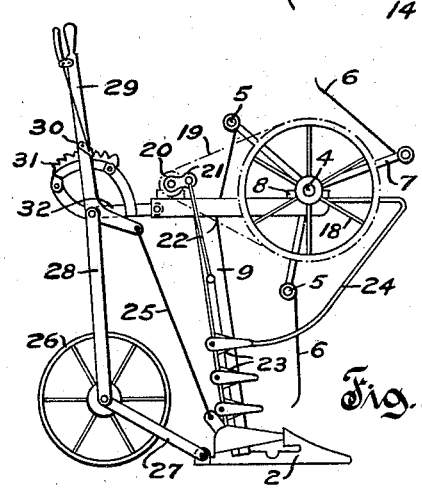
Fig. 5
Inventor
H. C. Schueler
by W. H. Lieber
Attorney Patented Mar. 3, 1931

1,794,646

UNITED STATES PATENT OFFICE

HENRY C. SCHUELER, OF NEW HOLSTEIN, WISCONSIN

HARVESTER

Application filed February 29, 1928. Serial No. 257,858.

The present invention relates in general to improvements in the art of harvesting, and relates more specifically to improvements in the construction and operation of mechanism for reaping vegetation such as peas, beans, clover or the like, wherein the plant stalks are of relatively irregular formation.

An object of the invention is to provide an improved harvester which will effectively reap irregular or vine-like plants such as peas, beans, clover and the like, without undesirably damaging the same. Another object of the invention is to provide a new and useful attachment for mowers, which may be readily applied to any standard mowing machine. A further object of the invention is to provide a simple, compact and highly efficient reaping implement for cutting matted vegetation at minimum cost and with least waste of the material. Still another object of the invention is to provide an improved reel structure which is cooperable with a reaper blade or knife to raise the plants located in the path of the advancing cutter away from the ground and to urge them toward the blade, thereby insuring rapid and efficient severance of the plants. A further object of the invention is to provide a reel attachment for harvesters which is comparatively light but sufficiently strong to perform its intended function, and which may be conveniently applied to or removed from a supporting cutter bar. Another object of the invention is to provide improved mechanism for effecting vertical adjustment of a combined cutter bar and reel. Still another object of the invention is to provide an improved side cutting attachment for mowers which will effectively sever plants extending across the end plane of the path containing the plants which are being harvested. A further object of the invention is to provide an improved reel structure which may be manufactured and sold at minimum cost. These and other objects and advantages will appear from the following description.

A clear conception of an embodiment of the various features of the invention and of the mode of operating devices constructed in accordance therewith, may be had by referring to the drawing accompanying and forming a part of this specification in which like reference characters designate the same or similar parts in the various views.

Fig. 1 is a perspective view of the improved harvester unit comprising a cutter and a reel associated therewith.

Fig. 2 is a somewhat diagrammatic end view of the mechanism for actuating the prongs during rotation of the reel, looking toward the driving end of the attachment.

Fig. 3 is a somewhat diagrammatic end view of the prong actuating mechanism, showing the prongs in a different position than that illustrated in Fig. 2.

Fig. 4 is a somewhat diagrammatic end view of the prong actuating mechanism, showing the prongs in still another position.

Fig. 5 is a somewhat diagrammatic end view of the improved attachment, looking toward the vertically adjustable end of the harvester unit.

The improved harvesting device specifically illustrated in the drawing, comprises in general an elongated cutter consisting of a cutter bar 2 and a reciprocable knife 3 associated therewith; a reel rotatably supported in end bearings 8 which are rigidly associated with and supported upon the cutter bar 2 by means of end supporting members 9; and mechanism for simultaneously raising or lowering the cutter and with respect to the ground.

The cutter is of standard and well known construction, the bar 2 thereof being provided with an integral bracket 17 for effecting attachment of the cutter to a mowing machine. The cutter knife 3 is reciprocable within the bar by means of well known connections operable by the mowing machine which function to operate the knife as the cutter is advanced along and in close proximity to the ground.

The improved reel which is carried by and above the cutter bar 2, comprises a central shaft 4 rotatably supported in the bearing 8 and having a driving end 16 operatively connectible with the mowing machine; a pair of end spiders 7 rigidly attached to the shaft 4; parallel bars 5 oscillatable in bearings formed in the spiders 7; a series of resilient prongs 6 rigidly attached to each of the bars 5; and mechanism for periodically moving the prongs 6 through definite cycles during rotation of the reel. The prong moving mechanism consists of an actuating lever 13 rigidly attached to each prong supporting bar 5 and having a roller 14 and an inwardly projecting actuating arm 15; a stationary cam track 11 and a cam rail 12 rigidly attached to the fixed supporting member 9; and a fixed roller 10 also supported by the member 9. The levers 5 may be provided with stops or other means for preventing free oscillation thereof, and are positively movable by engagement of the arms 15 with the fixed roller 10 in a manner to be later explained.

The end of the harvester unit remote from the mowing machine is provided with end cutting mechanism comprising an upright cutter bar and a vertically reciprocable cutter blade 23, associated therewith, a crank 21 for moving the blade 23 through a connection 22, and a chain drive or the like for transmitting rotary motion from the reel shaft 4 to the crank 21. The chain drive consists of a chain wheel 18 secured to the shaft 4, a sprocket 20 secured to the crank 21, and a chain coacting with the chain wheel and sprocket. A vine guard 24 located in front of the chain drive serves to prevent vegetation from becoming entangled with the mechanism.

The mechanism for simultaneously raising and lowering the cutter and the reel, consists of a guiding and supporting wheel 26 adapted to roll over the ground rearwardly of the cutter bar 2, parallel bars 27 connecting the axle of the wheel 26 with the end of the bar 2, an upright bar 28 supported by the wheel axle, an adjusting lever 29 pivotally associated with the upper end of the bar 28 and having a forwardly extending arm connected with the cutter bar 2 by means of a connecting rod 25, a link 32 connecting the upper end of the bar 28 to the reel supporting member 9, and a pawl 30 and toothed segment 31 for locking the elevating mechanism in adjusted position.

During normal operation of the improved harvester, the unit consisting of the cutter and reel, is operatively attached to a standard mowing machine in an obvious manner, so that when the mower advances along the ground, the cutter knife 3 is rapidly reciprocated within the forwardly advancing cutter bar 2 and the reel is simultaneously continuously rotated by the application of rotary motion to the driving end 16 of the shaft 4. The rotary motion of the reel supporting shaft 4 is transmitted through the chain drive and the crank 21 to the end cutting knife 23, and also causes the prongs 6 to periodically move toward and upwardly away from the advancing knife 3 so as to raise the plants located in the path of the cutter and to urge them toward the blade. As viewed in Figs. 2, 3 and 4, the reel rotates in a counter clockwise direction and the fixed cam track 11 and the rail 12 cooperate with the rollers 14 of the prong actuating levers 13, to advance the several sets of prongs 6 in the following manner. When the arm 15 of a lever 13 engages the fixed roller 10 as shown in Fig. 2, the prongs 6 associated with the roller engaging lever 13 are swung rapidly about the axis of their supporting rod to the position directly in advance of the cutter bar 2, shown in Fig. 3. The prongs 6 then continue to approach the cutter and to assume a more nearly upright position until the roller 14 carried by the prong actuating lever enters the gap between the cam track 11 and the rail 12, as shown in Fig. 4. The advancing prongs are then positively held against reverse swinging and advance toward and upwardly away from the cutter thereby raking the vines or plants in advance of the bar 2 rearwardly and upwardly relative to the approaching knife 3. When the roller 14 of the actuating lever 13 advances beyond the upper end of the rail 12, the prongs 6 are also withdrawn upwardly away from the plants, and the prongs 6 of that particular series become ineffective until the actuating lever thereof again engages the fixed roller 10. The successive series of prongs 6 pass through similar cycles of operation and insure effective raking of all vegetation located in the cutter path, with the result that the plants may be readily severed without damaging the pea or bean pods, or the like. The resiliency of the prongs 6 insures effective operation thereof without danger of destruction, and also facilitates withdrawal of the prongs from the mass of vegetation. It will thus be noted that the reel cooperates with the advancing cutter to insure effective severance of the plants located in the cutter path, and the end cutting mechanism serves to sever those stalks which extend transversely across the end plane bounding the path of cutting thereby defining a definite and clean cut path.

If it is deemed desirable to raise or lower the cutter relative to the ground, it is only necessary to release the locking pawl 30 and to manipulate the lever 29. The cutter and the reel may be raised simultaneously by merely pulling the lever 29 toward the rear, while forward movement of the lever 29 effects lowering of the unit. The relative position of the prongs 6 and cutter blade 3 is not altered during such adjustment, and the pawl 30 and toothed segment cooperate with the connecting elements to effectively lock the unit in adjusted position. The adjusting mechanism may obviously be manipulated without interfering with the normal operation of the attachment and without danger to the operator.

The improved attachment may be readily applied to any standard mowing machine, and by virtue of its simple and compact construction and effective operation for the purpose contemplated, has proven extremely popular with the trade. Due to the fact that the reel is supported in bearings which are rigidly attached to the cutter bar, the mechanism may be of relatively light construction but still sufficiently strong to withstand the service when operating upon densely matted vegetation. The appliance may be manufactured and applied at relatively low cost, and may be conveniently removed from the cutter bar when ordinary reaping is to be done.

It should be understood that it is not desired to limit the invention to the exact details of construction and operation herein shown and described, for various modifications within the scope of the claims may occur to persons skilled in the art.

It is claimed and desired to secure by Letters Patent:—

1. In a harvester, a cutter, a reel carried by and rotatable above said cutter, said reel comprising a plurality of parallel rods and a series of prongs secured to each of said rods and extending transversely of said cutter, each of said bars having a lever secured to an end thereof, and a cam track cooperable with said levers to periodically move said prongs toward and past said cutter in substantially upright position.

2. In a harvester, an elongated cutter adapted for advancement in close proximity to the ground, a reel rotatably supported in bearings rigidly attached to said cutter, said reel comprising spaced spiders having a plurality of parallel rods rotatably mounted thereon and provided with a series of prongs secured to each of said rods and extending transversely of said cutter, each of said bars having a lever secured to an end thereof, and a cam track having a stationary roller therein cooperable with said levers to periodically move said prongs toward and past said cutter in substantially upright position.

3. In a harvester, a cutter, a reel carried by and rotatably mounted in bearings rigidly associated with said cutter, said reel comprising several series of prongs successively movable past said cutter, a lever for periodically moving each of said series of prongs, a roller for periodically tilting each of said levers, and a cam track for limiting the motion of said levers.

4. In a harvester, an elongated cutter movable along the ground, a rod revolvable about an axis located above and disposed substantially parallel to said cutter, a series of prongs secured to said rod, a bell-crank lever secured to an end of said rod, a cam cooperable with one arm of said lever to move said prongs, and means providing a fixed abutment cooperable with the other arm of said lever to move said prongs.

5. In a harvester, an elongated cutter movable along the ground, a rod revolvable about an axis located above and disposed substantially parallel to said cutter, a series of laterally resilient prongs secured to said rod, a bell-crank lever secured to an end of said rod, an irregular cam cooperable with one arm of said lever to move said prongs along a definite path, and a roller providing a fixed abutment cooperable with the other arm of said lever to periodically swing said prongs.

6. In a harvester, a cutter comprising a toothed bar and a knife having cutting portions reciprocable relative to the teeth of said bar, a reel rotatably supported by said bar, said reel comprising a plurality of sets of prongs and a lever for actuating each of said sets, and a cam also carried by said bar for periodically moving said levers in succession.

7. In a harvester, a cutter comprising a bar and a relatively movable knife, bearings rigidly attached to the opposite ends of said bar, a reel rotatably supported in said bearings, said reel comprising a plurality of parallel rods and a series of prongs rigidly attached to each of said rods, and a cam track also rigidly attached to said bar and cooperable with said rods to periodically move said prongs toward and past said cutter.

8. In a harvester, a cutter comprising a bar and a relatively movable knife, bearings rigidly attached to said bar, a reel rotatably supported in said bearings, said reel comprising a shaft rotatably supported in said bearings, spiders secured to said shaft, rods rotatably supported in the arms of said spiders, prongs rigidly attached to said rods, levers secured to the corresponding ends of said rods, and a cam also rigidly attached to said bar and cooperable with said levers to periodically move said prongs toward and past said cutter.

In testimony whereof, the signature of the inventor is affixed hereto.

HENRY C. SCHUELER.